May 8, 1928.
H. R. BARTLETT ET AL
1,668,798
ELECTRIC METER
Filed May 26, 1927
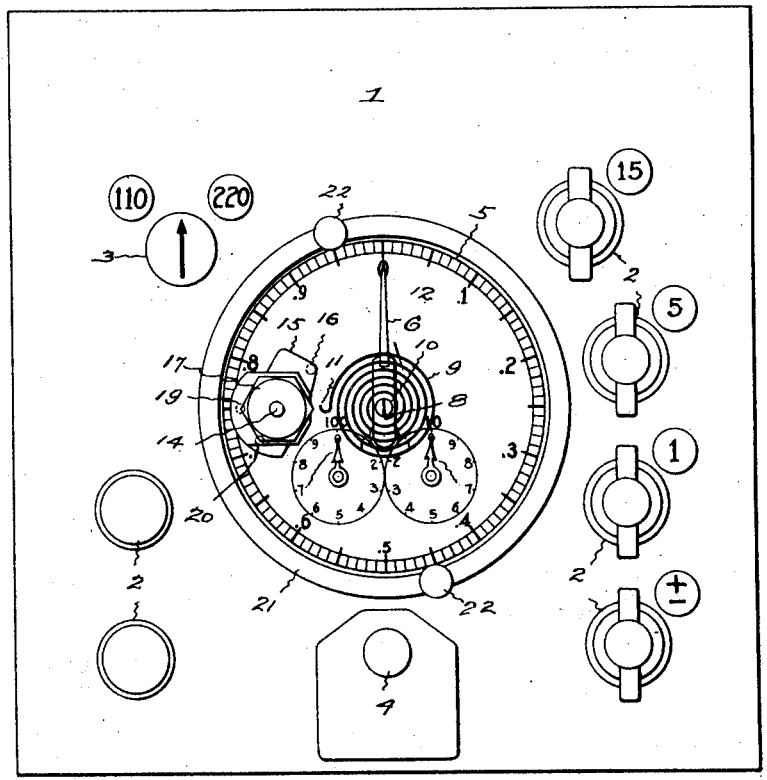
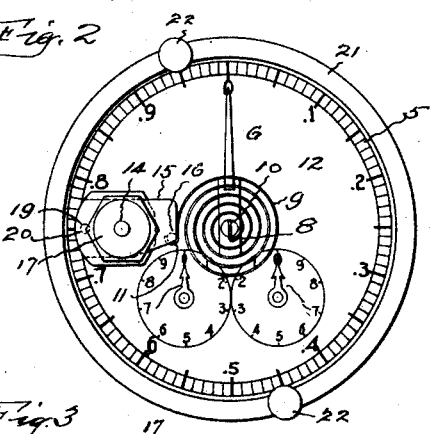
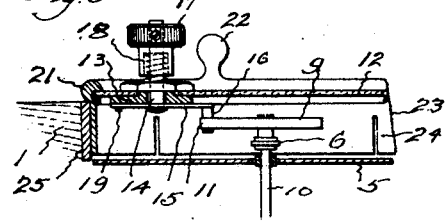
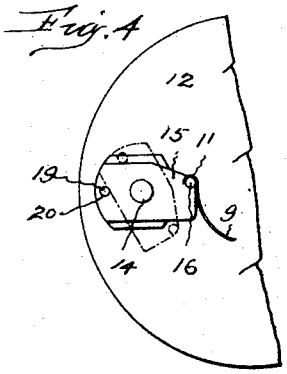
INVENTORS.
Henry R. Bartlett &
Henry J. Blakeslee
Harry P. Williams
ATTORNEY Patented May 8, 1928.

1,668,798

UNITED STATES PATENT OFFICE.

HENRY R. BARTLETT AND HENRY J. BLAKESLEE, OF WEST HARTFORD, CONNECTICUT, ASSIGNORS TO THE STATES COMPANY, OF HARTFORD, CONNECTICUT, A CORPORATION OF CONNECTICUT.

ELECTRIC METER.

Application filed May 26, 1927. Serial No. 194,351.

This invention relates to an electric meter which is so constructed that it may be used as an energy meter or as a power meter.

The object of the invention is to provide a portable rotating standard meter, such as is commonly used for testing service meters, with means whereby the same instrument may be used as a watt meter for indicating the power or load on a circuit including the meter being tested.

This object is attained by applying to a rotating standard meter, a spring and means that can be manipulated to connect or disconnect the spring between the spindle or indicating pointer and a fixed part of the meter, whereby when the spring is disconnected the pointer will rotate over the dial and indicate energy, as usual, but when the spring is connected the torque of the spindle or pointer will be balanced by the tension of the spring so that the pointer will indicate load, the means for connecting and disconnecting the spring being adjustably mounted so that the tension of the spring exerted on the pointer may be regulated.

In the accompanying drawings Fig. 1 shows a plan of a portable test meter provided with a preferred arrangement of means whereby the instrument may be used as a rotating standard or as an energy meter when so desired, the spring in this view being shown disconnected, as when the instrument is to be used as a common rotating standard for testing service meters. Fig. 2 shows a view of the dial and indicating means removed from the instrument with the spring connected, as when the instrument is to be used for indicating the load on the meter. Fig. 3 is a fragmentary section showing the means for engaging and holding fixed one end of the spring when the instrument is to be used for indicating load. Fig. 4 is a view looking from the inside of the glass cover over the dial, showing the adjustable means for temporarily anchoring the end of the spring.

The case 1 encloses the mechanism of a common type of portable test meter. On the top of the case are the usual binding posts 2 for attaching the connections with the line, load and meter to be tested, also the switch button 3 and the indicator pointer return button 4. The graduated dial 5 shows through an opening in the top of the case, and traveling over the dial is the indicating pointer 6 and counting pointers 7. These parts are well known and are connected in the ordinary way so need no further detailed description to be understood by those familiar with this art.

In the form of invention illustrated the end 8 of a light coil spring 9 is attached to the spindle 10 upon which the pointer 6 is mounted. The other end of the spring is shown as having a hook 11.

Fastened in a hole in the glass 12 that covers the dial is a bushing 13. Rotatably and longitudinally movable in this bushing is a spindle 14. Fastened on the inner end of the spindle is a plate 15 with an inwardly extending stud 16. On the outer end of the spindle is a handle 17, a spring 18 being arranged on the spindle to normally press the handle outward and hold the plate against the inner end of the bushing. There is a pin 19 projecting inwardly from the bushing which is adapted to enter a perforation 20 in the plate. The stud 16 is so located that when the handle is turned to one position the stud will engage the hook on the free end of the spring, and when the handle is turned to another position the stud will release the spring so that it will turn freely with the pointer 6. To turn the plate carrying the stud the handle is pushed in so as to free the plate from the pin.

The glass over the dial is shown as held in a bezel 21 which has knobs 22 on the outside and a sleeve-like extension 23 with slots 24 on the inside, so that the bezel may be sprung into the bushing 25 seated in the top of the case. With this arrangement the bezel with the glass may be sprung into place and turned at any time to a position which will insure such an engagement of the anchor stud with the spring that the spring will have the correct tension.

With the plate turned so that the stud is out of the path of the hooked free end of the spring, as illustrated in Fig. 1, the pointer can rotate freely and the instrument be used as an ordinary rotating standard for testing service meters. By pushing in and turning the handle the plate may be moved to the position shown in Fig. 2, in which the stud will engage the hooked end of the spring and hold it. In this position the pin enters the perforation in the plate and holds it so as to anchor the hooked end of the spring. With the parts in this condition the torque of the spindle is balanced by the spring so that the pointer will indicate load and permit the instrument to be used as a watt meter.

By the employment of this invention, which contemplates the arrangement of a spring adapted to be by suitable means connected between or disconnected from between the spindle or pointer and a fixed part, the instrument is instantly capable of being used as a rotating standard for measuring energy or as a watt meter for measuring load.

The invention claimed is:—

1. An electric meter having a rotatable member, a spring arranged to be connected between a fixed part of the instrument and said rotatable member, and adjustable means for connecting and disconnecting the spring between said rotatable member and fixed part, whereby when the spring is disconnected the rotatable member can rotate freely and indicate energy and when the spring is connected its tension will oppose the torque of the rotatable member which will then indicate load, when the meter is connected in a live circuit.

2. An electric meter having a rotatable indicating pointer, a spring arranged to be connected between a fixed part of the instrument and the pointer, and means for connecting or disconnecting the spring between said pointer and fixed part, whereby when the spring is disconnected the pointer can rotate freely and indicate energy and when the spring is connected its tension will oppose the torque of the pointer which will then indicate load, when the meter is connected in a live circuit.

3. An electric meter having a rotatable indicating pointer, a coil spring with one end connected with the pointer and the other end normally free so that the spring will rotate with the pointer, and means adapted to be engaged with and hold the free end of the spring so that the tension of the spring will oppose the torque of the pointer when the meter is connected in a live circuit.

4. An electric meter having a rotatable indicating pointer, a coil spring having one end connected to and rotatable with the pointer and the other end free and a stud movable into and out of the path of the free end of the spring said stud when in the path of said end of the spring engaging and retaining that end so that the tension of the spring will oppose the rotation of the pointer.

5. An electric meter having a rotatable indicating pointer, a coil spring having an end connected to and rotatable with the pointer and a free end provided with a hook, a stud rotatably mounted and adapted to be moved into and out of the path of the hooked end of the spring, and means for rotating said stud, said stud when in the path of said end of the spring engaging and retaining that end so that the tension of the spring will oppose the rotation of the pointer.

6. An electric meter having a rotatable indicating pointer, a spring arranged to be connected between a fixed part of the instrument and the pointer, a stud for connecting or disconnecting the spring between said pointer and fixed part, whereby when the spring is disconnected the pointer can rotate freely and when the spring is connected its tension will oppose the actuating torque of the pointer, and a rotatable support for said stud whereby it may be adjusted to regulate the balancing tension of the spring.

HENRY R. BARTLETT.
HENRY J. BLAKESLEE.